Jan. 19, 1932.  C. J. HUGHES  1,841,815
AIRCRAFT
Filed April 30, 1930    6 Sheets-Sheet 5
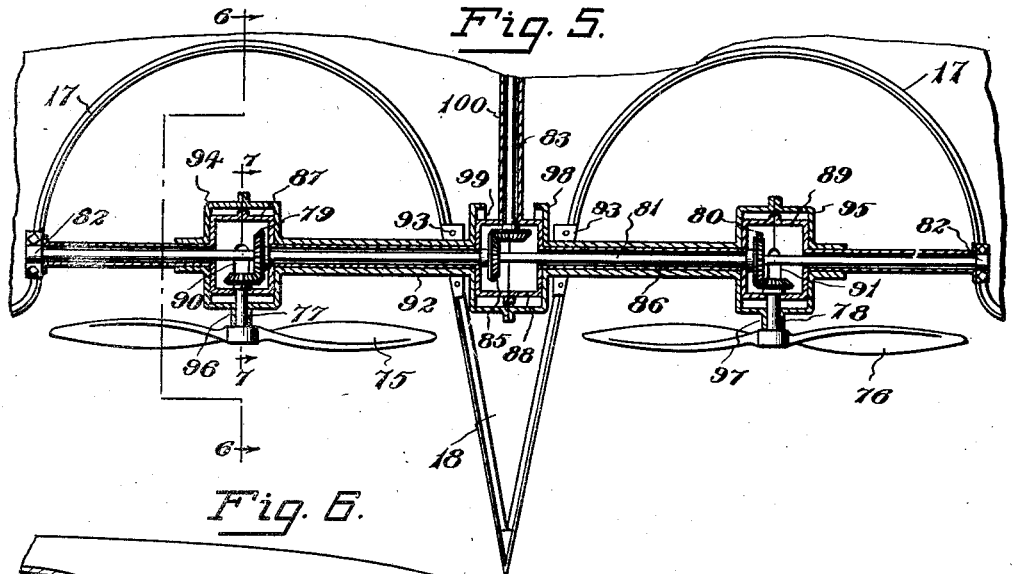
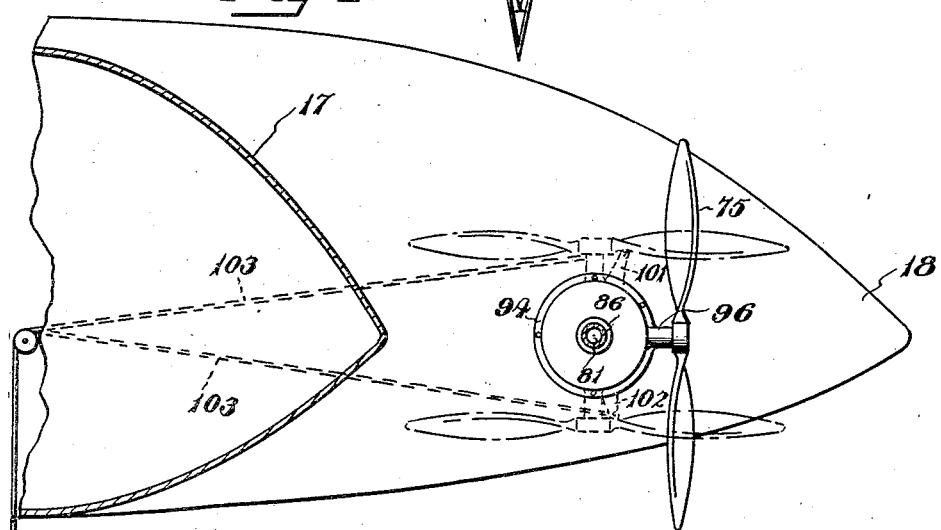
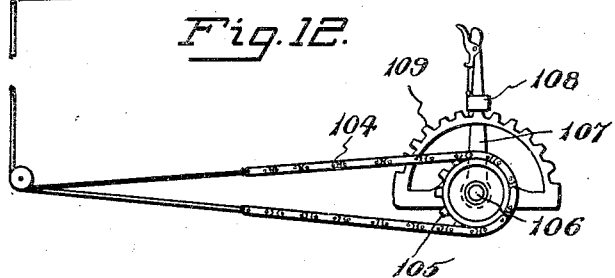
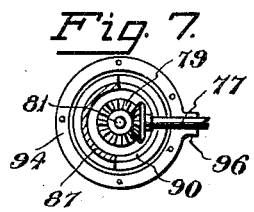
Inventor
C. J. Hughes
By Lacey+Lacey, Attorneys Jan. 19, 1932.  C. J. HUGHES  1,841,815
AIRCRAFT
Filed April 30, 1930    6 Sheets-Sheet 6
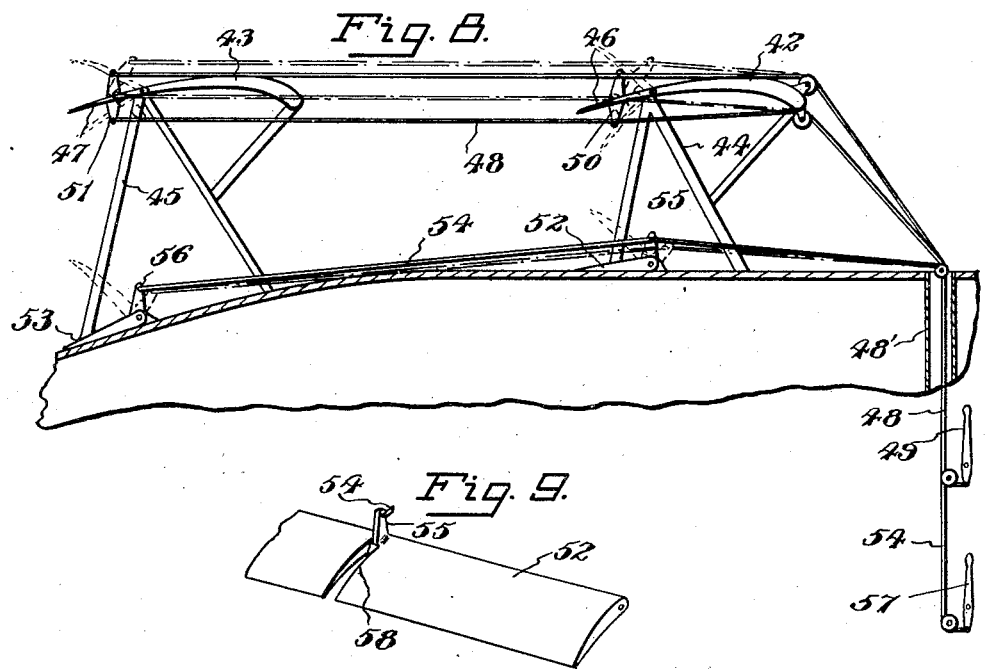
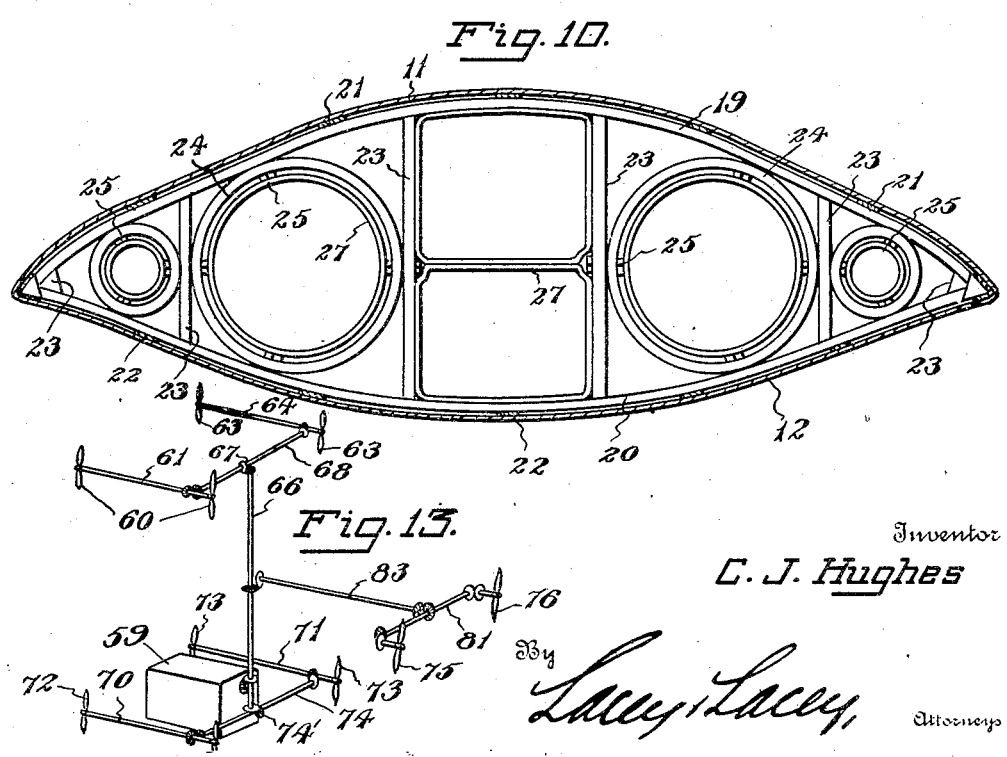
Inventor
C. J. Hughes
By Lacey & Lacey,
Attorneys Patented Jan. 19, 1932

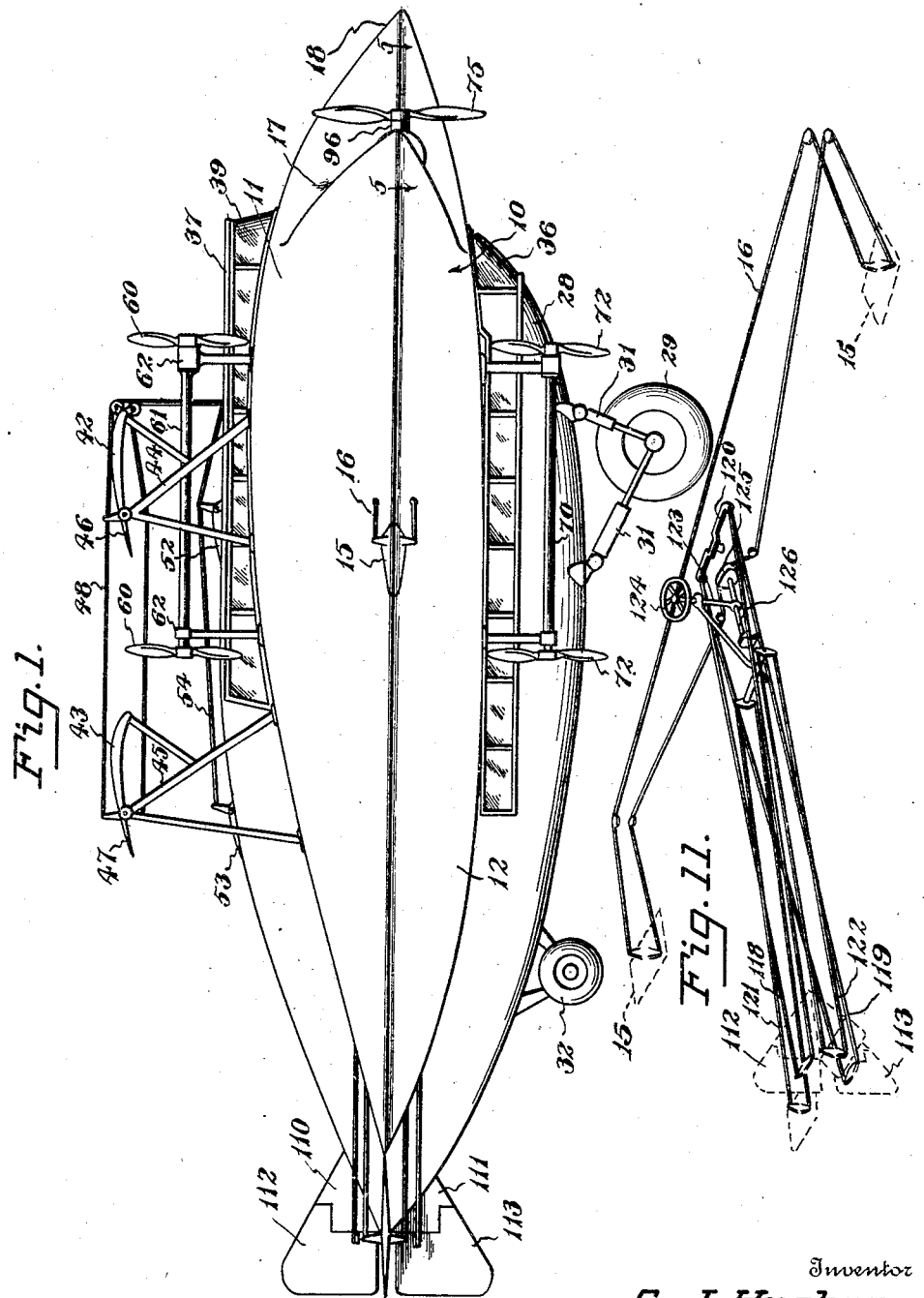

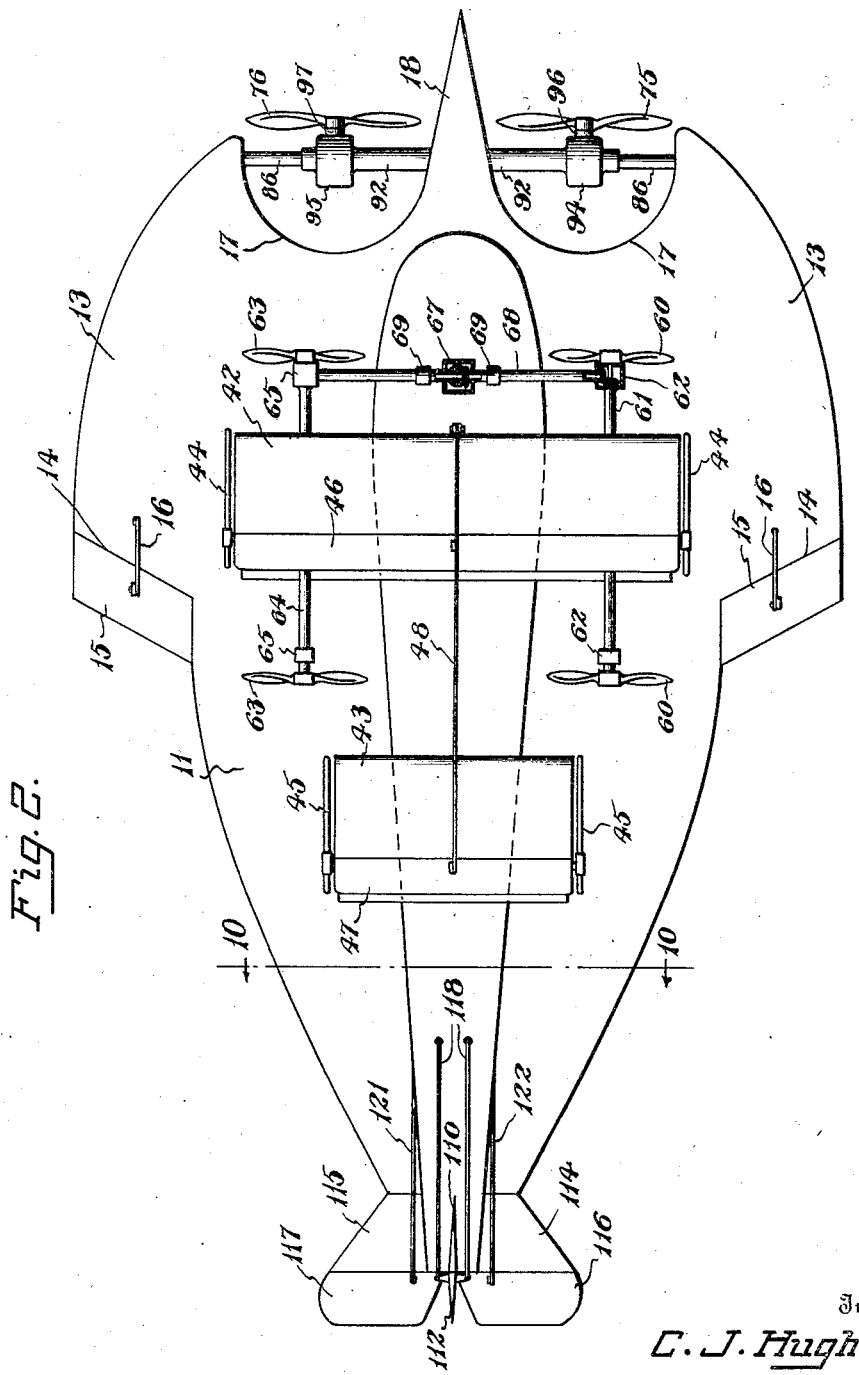

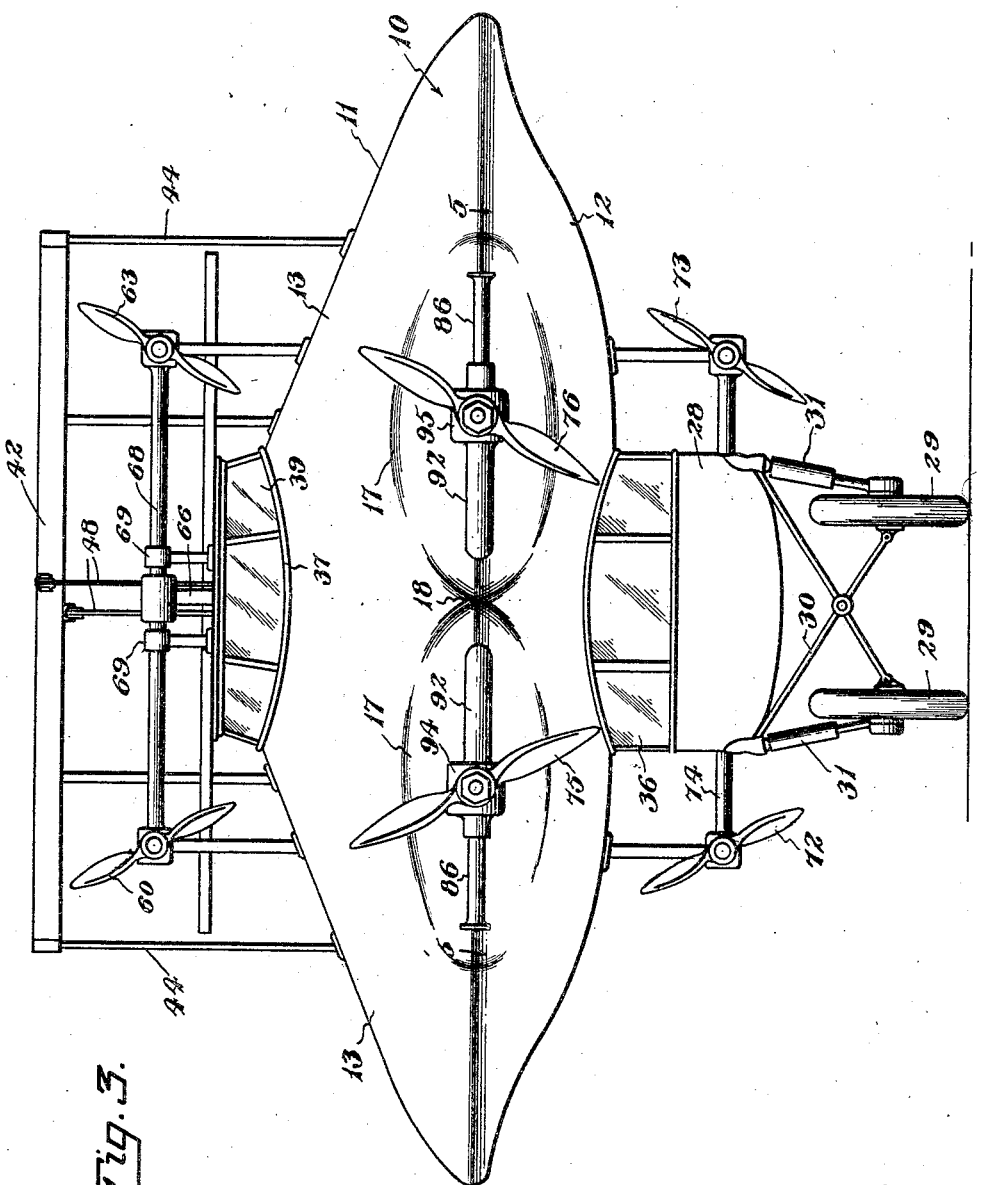

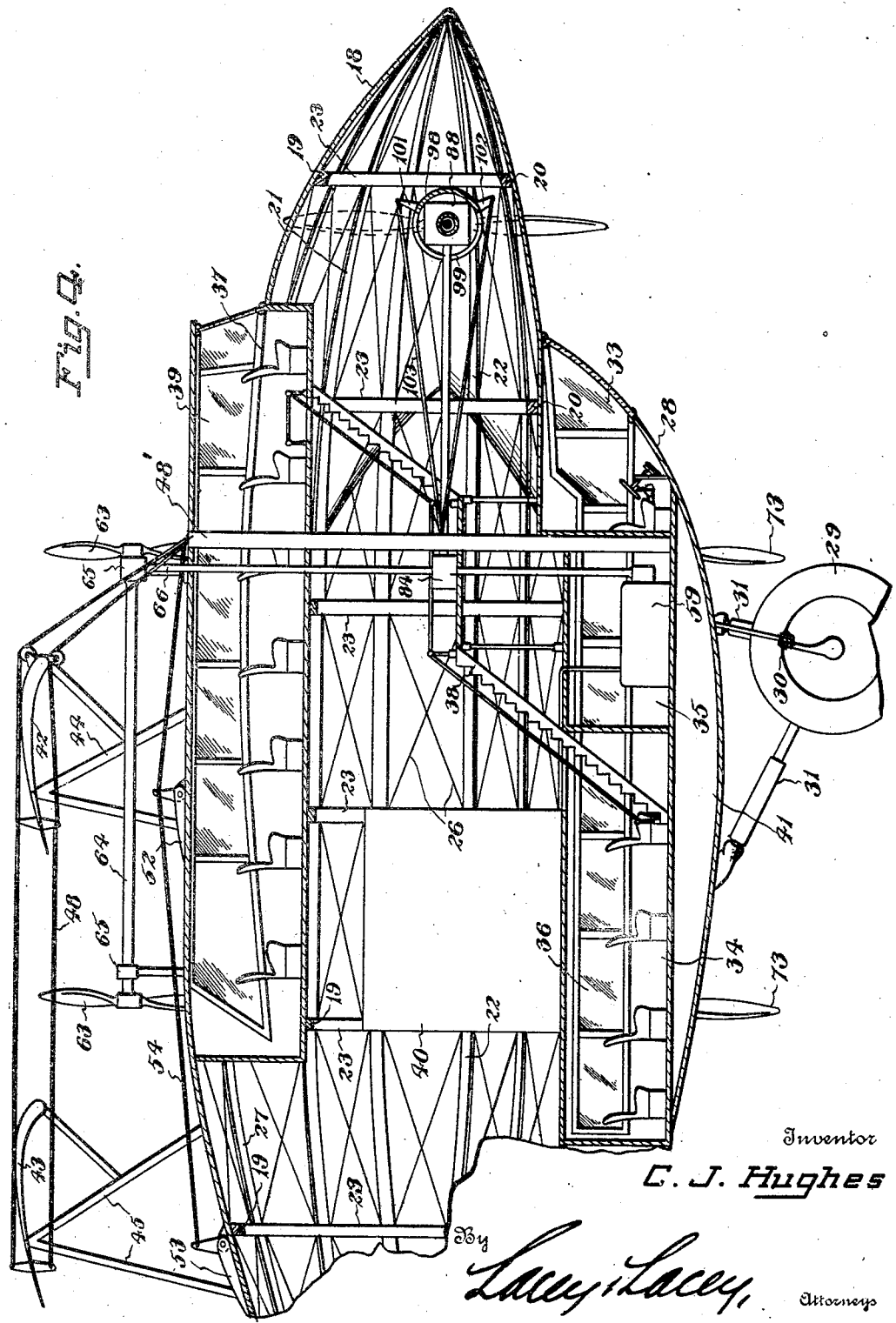

1,841,815

UNITED STATES PATENT OFFICE

CHARLES J. HUGHES, OF MONTGOMERY, ALABAMA

AIRCRAFT

Application filed April 30, 1930. Serial No. 448,627.

This invention relates to aircraft of that general class having incorporated therein features of established value common to both lighter than air and heavier than air types.

An object of the present invention is to provide an aircraft of this type having propellers which may be directed downwardly, upwardly, or forwardly whereby to correspondingly assist in making a landing or in taking off substantially vertically, or in cruising.

Another object is to provide an aircraft in which the dirigible component itself constitutes a wing and is further provided with novel airplane wings arranged one behind the other on the top surface of the dirigible component to promote maneuvering of the craft and to assist in taking off or landing safely in small areas.

Another object is to provide an aircraft which combines the lifting capacity of a dirigible with the speed capacity of an airplane whereby greater cruising range at greater speed is promoted, and having a fuselage of such design that taking off or landing on water or land may be accomplished with equal ease.

Another object to to provide an aircraft having the airplane wings on the dirigible component provided with novel elevator flaps which coact with novel pivoted flaps and function therewith as brakes which retard the air stream and assist in landing at slow speed.

Another object is to provide an aircraft having the dirigible component of such novel construction as to provide gas cell compartments all assembled in a rigid unitary structure and permitting of distribution of the gas cells over a wide lateral area amidship and forward of the craft where the load of cargo or passengers or both, is greatest.

With the above and other objects in view the invention consists in certain novel details of construction and combinations of parts hereinafter fully described and claimed, it being understood that various modifications may be resorted to within the scope of the appended claims without sacrificing any of the advantages or departing from the spirit of the invention.

In the accompanying drawings forming part of this specification,

Figure 1 is a side elevation of my improved aircraft,

Figure 2 is a plan view thereof,

Figure 3 is a front elevation thereof,

Figure 4 is an enlarged longitudinal sectional view of the aircraft with the rear portion broken away and with parts in elevation, Figure 5 is an enlarged cross-sectional view taken on the line 5—5 of Figure 1, Figure 6 is a longitudinal sectional view taken on the line 6—6 of Figure 5, Figure 7 is a detail sectional view taken on the line 7—7 of Figure 5, Figure 8 is a detail sectional view showing the spaced auxiliary wings and the ailerons and air foils which coact as air brakes, Figure 9 is a detail perspective view of a portion of the front air foil, Figure 10 is an enlarged cross sectional view taken on the line 10—10 of Figure 1 showing the internal structure of the dirigible component.

Figure 11 is a diagrammatic view showing the controls for the ailerons, the rudders and the elevator flaps of the dirigible component, Figure 12 is a detail side elevation of the control lever for shifting the front propellers, and Figure 13 is a diagrammatic view showing the arrangement of the shafts which transmit power from the motor to the propellers.

Referring now to the drawings in which like characters of reference designate similar parts, the dirigible component 10 of the aircraft is preferably formed with a cambered upper surface 11 and a downwardly curved lower surface 12, both surfaces being flattened at the junctures of the sides and ends to produce stream lines. A cross-section of the structure taken at any particular point as for instance on the line 10—10 of Figure 1, as shown in Figure 10 partakes substantially of the contour of a shallow ellipse. The upper and lower surfaces are extended laterally beyond the sides of the structure, from a point approximately midship to substantially the nose of the structure, as best shown in Figure 2, to provide lateral lobes 13 the purpose of which will hereinafter be more fully explained.

The trailing edges 14 of the lobes are flattened to produce stream lines and preferably are disposed to extend obliquely rearwardly toward the longitudinal axis of the structure. Ailerons 15 are pivoted on the trailing edges of the lobes and are provided with control cables 16 for operating the ailerons to balance or to bank the aircraft. It will thus be apparent that the dirigible component itself constitutes a wing the lateral stability of which is controlled by the ailerons 15.

The leading edges of the lobes as well as the nose portion of the structure therebetween, are cut away to form recesses 17 and a resultant pointed separating partition 18. The purpose of these recesses is to receive propellers which may be manipulated for depressing or elevating the nose in landing or taking off and which will later be described in detail.

Referring now to Figure 4 and Figure 10, it will be seen that the upper and lower surfaces are respectively braced transversely by transverse girders 19 and 20, and are reinforced longitudinally by longitudinal girders 21 and 22. Vertical braces 23 are arranged in rows both longitudinally and transversely of the structure and connect the upper transverse girders and lower transverse girders. To further strengthen the structure, reinforcing rings 24 are arranged in transverse rows throughout the structure and are bolted as shown at 25 or otherwise rigidly secured to the vertical braces and to the upper and lower girders. Wire cables 26 or other suitable braces tie together the vertical braces as best shown in Figure 4.

The girders, braces and rings are preferably formed of light strong metal and are sufficient in number to produce a rigid unitary frame work or skeleton upon which is stretched the outer envelope of light strong fabric treated with "dope" as is usual in dirigible construction.

Gas cells such as ballonets or other suitable lifting gas containers 27 are confined within the enclosure between the upper and lower surfaces 11 and 12. These cells are of suitable shape to fit the configuration of the compartments formed by the reinforcing rings, vertical braces and girders and may be supplied with lifting gas of any preferred type by means of any suitable conductors and may also be vented in any preferred manner. The gas cells are distributed within the interior of the dirigible component to suit the conditions of service whether passenger or freight, or both, under which the ship is to be operated and are sufficient in number to render the structure buoyant under all conditions of service.

As heretofore stated the lateral lobes 13 produce extreme width in the structure from a point substantially midship to the nose of the structure, and this permits of somewhat extensive localizing of the gas cells in the forward portion of the structure and in the lateral lobes where the weight of the cargo and passengers is greatest. It will also be apparent that by means of this construction the center of gravity will be located forward of the longitudinal center of the structure so that ease in controlling the aircraft will be promoted.

In the present embodiment of the invention a fuselage 28 is built into the lower surface 12 of the dirigible component 10 and is rounded longitudinally and transversely as best shown in Figures 1, 3 and 4 to provide a boat for landing or taking off on water. The fuselage is further equipped with an undercarriage comprising wheels 29 which are suitably braced as shown at 30 and preferably provided with shock absorbers 31 to reduce the jars of taking off or landing on land. A wheel 32 is secured to the rear of the structure instead of the usual tail skid since the aircraft is provided with pivoted flaps for retarding the speed of the aircraft in landing as will be hereinafter fully described.

The fuselage is divided into a pilot's compartment 33 and a passenger compartment 34 and also a motor room 35, suitable windows 36 being provided throughout the length and front of the fuselage for the convenience of the passengers and pilot. There is also built into the upper surface 11 a passenger compartment 37 which forms a top deck for the fuselage and this deck reached from the fuselage by means of a suitable stairway 38. Windows 39 are arranged along the longitudinal sides and front of the deck compartment.

A fuel tank 40 is shown located amidship between the passenger compartments and if desired a plurality of these tanks may be used to increase the cruising range of the craft. It is to be understood that a passage way is as usual arranged longitudinally of the structure to permit access of the crew to any part of the dirigible when necessary. It is to be further understood that cargo may be stored within the body of the dirigible in addition to the fuel supply tanks. The bottom portion 41 of the fuselage constitutes a compartment for the water ballast usually employed in aircraft of the lighter than air type.

Referring to Figure 2 and Figure 3 it will be seen that arranged above the upper surface 11 is a pair of airplane wings 42 and 43 disposed one behind the other. The wing 42 is positioned transversely across the forward portion and the wing 43 is positioned transversely across the rear portion of the dirigible component. The ends of the forward wing 42 are rigidly secured to the upper surface 11 by means of struts 44 and the ends of the rear wing 43 are rigidly secured to the upper surface 11 by struts 45. Both wings are cambered in accordance with the usual airplane wing practice and assist in supporting the ship.

The forward wing 42 is provided on its trailing edge with a pivoted flap 46 which extends the entire length of the wing and likewise the rear wing 43 is provided on its trailing edge with a pivoted flap 47 which extends the entire length of the wing. A control cable 48 is conducted through a pipe 48′ and is connected to a control lever 49 within convenient reach of the pilot. The cable is also connected to vertical fingers 50 and 51 of the flaps and operates to tilt the flaps simultaneously in the same direction either up or down. These flaps perform the function of elevator flaps and are manipulated by the pilot to assist in maneuvering the craft and also to assist in taking off or in landing nearly vertically in small areas.

As best shown in Figure 4, Figure 8 and Figure 9 there are arranged on the upper surface of the dirigible component pivoted flaps 52 and 53, both flaps being substantially the same in length as the elevator flaps 46 and 47 which overlie them and being normally disposed to lie in inactive position against the upper surface 11. An operating cable 54 is connected to vertical fingers 55 and 56 on the flaps and is led through the pipe 48′ and connected to an operating lever 57 within convenient reach of the pilot. The cable operates to raise the flaps simultaneously as indicated in dotted lines in Figure 8 and in this position the flaps intercept and retard the air stream flowing over the upper surface and act as brakes to slow down the craft when making a landing. The elevator flaps 50 and 51 of the airplane wings may be pulled downwardly at the same time the flaps 52 and 53 are pulled upwardly to cause the air stream between the upper surface of the dirigible component and the airplane wings to pass through bottle necks whereby to further assist in landing at slow speed. By referring to Figure 9 it will be seen that the front brake flap 52 is provided with a slot 58 extending from its trailing edge to the base of the finger 55, the purpose of which is to receive the cable 54 when the flap is tilted upwardly.

For propelling the aircraft a motor 59 is located in the motor compartment 35 of the fuselage. A plurality of pusher propellers are employed in the present embodiment and are operatively connected to the motor by shafts and gears as shown diagrammatically in Figure 13. However, it is to be understood that the ship may be propelled by an individual motor for each propeller if desired without sacrificing any of the advantages of the invention.

In the specific construction illustrated, it will be seen by referring to Figure 2 that a pair of propellers 60 are secured to a common shaft 61 carried in bearings 62 secured to the upper surface 11 on the right side of the craft and on the left side of the craft this construction is duplicated, the propellers 63 being secured to a common shaft 64 carried in bearings 65 secured to the upper surface of the craft. The propellers on the right side of the craft are rotated oppositely from those on the left side of the craft by means of a stand shaft 66 which is geared to the motor as shown in Figure 13, and at the upper end is geared as indicated in general by the numeral 67 to the center of a shaft 68 which is carried in bearings 69 on the upper surface 11. The shaft 68 is terminally geared to and drives the propeller shafts 61 and 64.

The arrangement of the propellers above the upper surface 11 of the dirigible component is duplicated beneath the lower surface 12 and for the purpose of brevity it will be simply stated that the lower right and left propeller shafts 70 and 71 are equipped with corresponding propellers 72 and 73. A shaft 74 is centrally geared to the stand shaft 66 as shown at 74′ in Figure 13, and is terminally geared to and drives the propeller shafts 70 and 71, the propellers 72 on the right side of the craft being driven oppositely from the propellers 73 on the left side of the craft.

On the sheet of drawings containing Figures 5, 6, 7 and 12 there are shown dual nose propellers and their driving mechanism which will now be described in detail. The nose propellers 75 and 76 are mounted in the recesses 17 on opposite sides of the separating partition 18 which enables each propeller to operate without being affected by lateral wash of the other propeller. The shafts 77 and 78 of the propellers are geared as indicated in general at 79 and 80 to a transversely disposed driven shaft 81 which passes through the separating partition 18 and is terminally journaled in suitable bearings 82 secured to the walls of the recesses 17. The driven shaft drives the propeller 75 oppositely from the propeller 76 to neutralize torque in so far as possible.

A drive shaft 83 is suitably mounted at the inner end in a gear case 84 as shown in Figure 4 and is geared to the stand shaft 66 which, as heretofore stated, is driven by the motor 59. The outer end of the drive shaft 83 is geared to the driven shaft 81 as indicated at 85 whereby the propellers are driven continuously whether directed downwardly, upwardly or forwardly to control the nose of the ship as will now be described.

A stationary tubular housing 86 surrounds the driven shaft 81 and is anchored at the ends to the walls of the recesses 17 and is further equipped with three integral spaced gear cases 87, 88 and 89 which house respectively the gears 79, 85 and 80. The gear cases 87 and 89 are provided with slots 90 and 91 which extend substantially through an angle to 180° on the front side of each gear case as best shown in the detail Figure 7 and permit of the propeller shafts 77 and 78 being rocked through an angle of 180° whereby the propellers may be directed downwardly to depress the nose in making a landing, or upwardly to lift the nose in taking off, or forwardly to act as puller propellers while the craft is cruising.

For manipulating the propellers as just described a tubular rotary housing 92 is mounted on the stationary housing 86 and is journaled in suitable bearings 93 secured to the walls of the separating partition 18, and is further provided at the ends with integral housings 94 and 95 which surround the propeller gear cases 87 and 89. These housings are provided with integral journal boxes 96 and 97 in which the propeller shafts 77 and 78 are rotatably received. When the tubular rotary housing 92 is rotated on the stationary housing 86, the housings 94 and 95 carry the propellers 75 and 76 as a unit therewith in an arc around the stationary housing 86 as an axis.

The tubular rotary housing 92 is centrally provided with an integral housing 98 which surrounds the gear case 88 and by means of which the rotary housing 92 is turned. There is a slot 99 formed in the rear wall of this housing which receives the housing 100 of the driving shaft 83 to permit rotary movement of the rotary housing. Fingers 101 and 102 project from the housing 98 at substantially opposite points thereof and to these fingers are connected the ends of a control cable 103 by means of which the tubular rotary housing 92 is turned to shift the propellers.

Preferably the ends of the cable 103 are connected to a sprocket chain 104 which is trained over a sprocket wheel 105 carried by a shaft 106. An operating lever 107 is fixed to the shaft within convenient reach of the pilot for rotating the same to operate the cable 103. There is a pawl 108 on the lever engaging the teeth of a segment rack 109 for holding the lever in central position to direct the propellers 75 and 76 forwardly, or in position at either limit of its movement to direct the propellers either upwardly or downwardly.

Figure 11 shows an arrangement of cables for operating the before mentioned ailerons 15 of the dirigible component as well as for operating the steering and elevator controls at the tail of the dirigible component.

The tail of the dirigible component 13 is provided with upper and lower vertical stabilizer fins 110 and 111 to which are pivoted upper and lower vertical rudders 112 and 113. Also fixed to the tail are right and left horizontal stabilizer fins 114 and 115 to which are pivoted right and left horizontal elevator flaps 116 and 117. The vertical rudders are operated by corresponding cables 118 and 119 which are connected to a rudder bar 120 disposed within convenient reach of the pilot. The elevator flaps are operated by corresponding cables 121 and 122 which are connected to a control stick 123 having a wheel grip 124. Backward or forward movement of the control stick serves to tilt the elevator flaps to point the nose of the ship upward or downward in the usual manner.

The above mentioned ailerons 15 carried by the lateral lobes of the dirigible component are operated by a cable 16 the ends of which are connected to a segment 125 carried by a rock shaft 126 to which the control stick 123 is pivoted, lateral rocking of the control stick serving to tilt the ailerons in opposite directions for balancing or for banking the dirigible component.

From the above description the construction and operation of the aircraft will be clearly understood so that further detailed description of the operation is thought to be unnecessary.

Having thus described the invention, I claim:

1. In a combined dirigible and airplane, a dirigible component having a cambered upper surface and a downwardly curved lower surface, said surfaces being extended laterally beyond the sides from a point about midship to substantially the nose of the structure to provide lateral lobes, ballonettes confined by said surfaces within the lobes, airplane wings on said upper surface, a built-in fuselage on said upper surface above the lobes, and a built-in fuselage on said lower surface beneath said lobes.

2. In a combined dirigible and airplane, a dirigible component having oppositely curving upper and lower surfaces, ballonetttes confined between the surfaces, said surfaces being flattened at the junctures of the sides and ends to produce stream lines, said surfaces being extended laterally from a point substantially midship, passenger fuselages above and below said laterally extended portions, ailerons on the trailing edges of said laterally extending portions, a pilot's compartment carried by the lower fuselage, and means for operating the ailerons from the pilot's compartment whereby to balance said dirigible component laterally.

3. In a combined dirigible and airplane, a dirigible component having upper and lower surfaces curved oppositely to each other and of greatest lateral width adjacent the nose portion, ballonettes between said surfaces, ailerons on said wide portions of said surfaces to balance the dirigible component laterally, fuselages built in above and below said wide portion of the surfaces, and airplane wings above said upper surface in rear of said wide portion and said upper fuselage to assist in supporting the dirigible component.

4. In a combined dirigible and airplane, a dirigible component having lateral lobes extending from the body of said component near the nose thereof, ballonettes in said lobes, ailerons on said lobes, passenger compartments above and below said lobes, there being a recess formed in said nose portion between said passenger compartments, and a propeller in said recess adapted to be directed upwardly, downwardly or forwardly for maneuvering the nose portion of said dirigible component.

5. In a combined dirigible and airplane, upper and lower surfaces, the upper surface being cambered and the lower surface being downwardly rounded, both surfaces being flattened at the junctures of the sides and ends to provide stream lines, and being extended laterally beyond the sides of the structure to provide extreme width between midship and the nose of the structure whereby the dirigible component itself functions as a wing, upper and lower passenger compartments on said surfaces, a companion way connecting the compartments, a pilot's compartment in the front of the lower passenger compartment, ailerons on the trailing edges of said laterally extending portions for balancing the dirigible component, and lifting gas cells confined in the enclosure formed by said surfaces.

6. In a combined dirigible and airplane, upper and lower surfaces curving oppositely with respect to each other and flattened and elongated laterally whereby a cross section thereof partakes of the contour of a shallow ellipse, ailerons on the sides of said surfaces disposed substantially midship, lifting gas cells confined between said surfaces, fuselages built in the upper and the lower surfaces and connected together, the lower fuselage and said lower surface forming a boat for landing on water, and an undercarriage on said lower fuselage equipped with landing wheels.

7. In a combined dirigible and airplane, upper and lower surfaces forming an enclosure therebetween, ballonettes in said enclosure, motor and baggage compartments in said enclosure, passenger compartments built into said upper and said lower surfaces and having a connecting companion way passing through said enclosure, there being a recess formed in the nose portion of said surfaces, the surfaces being flattened at said recess to produce stream lines, a propeller in said recess adapted to be directed upwardly, downwardly and forwardly for maneuvering the ship in landing or taking off and in cruising, propellers above the upper surface, propellers below the lower surface, and means for continuously driving said propellers simultaneously.

8. In a combined dirigible and airplane, a dirigible component, passenger compartments above and below the dirigible component, airplane wings on the upper surface of the dirigible component above the upper passenger compartment, ailerons on the sides of said dirigible component for maintaining lateral stability thereof, elevator flaps on the trailing edges of said wings for assisting in taking off or landing the ship nearly vertically, and an airplane wing on said upper surface below one of the first-named wings and oppositely movable thereto for forming an air brake in landing.

9. In a combined dirigible and airplane, a dirigible component, lifting gas cells therein, passenger compartments above and below the dirigible component connected by a companion way passing through the structure of the dirigible component, there being a recess formed in the nose of said dirigible component, a propeller in said recess adapted to be directed upwardly and also downwardly to assist in lifting or dropping the nose of the dirigible component, airplane wings on the upper surface of said dirigible component, and elevator flaps on the trailing edges of said wings for assisting said propeller in landing or taking off.

10. In a combined dirigible and airplane, a dirigible component, lifting gas cells therein, airplane wings on the upper surface of said dirigible component assisting in supporting the weight thereof, elevator flaps on the trailing edges of said wings adapted to assist in maneuvering the ship, the flaps pivoted on said dirigible component and underlying said elevator flaps and adapted to be tilted upwardly to intercept the air stream between said dirigible component and said wings and retard the ship when making a landing.

11. In a combined dirigible and airplane, a dirigible component, lifting gas cells therein, airplane wings above said dirigible component, elevator flaps on said wings, pivoted flaps on said dirigible element, and means for moving said elevator flaps downwardly and simultaneously moving said pivoted flaps upwardly whereby the air stream is directed through bottle necks formed by both of said flaps to slow down the speed of the ship when landing.

12. In aircraft, a driven shaft, a stationary housing for said driven shaft, a rotary housing surrounding said stationary housing, a propeller having a shaft geared to said driven shaft, a housing integral with said rotary housing having a tubular bearing rotatably receiving said propeller shaft, and means for rotating said rotary housing whereby to rotate said integral housing and selectively dispose said propeller above or below said driven shaft.

In testimony whereof I affix my signature.

CHARLES J. HUGHES.